March 29, 1927.  
C. O. MARSHALL  
PROPELLER  
Filed Sept. 8, 1921  
1,622,835
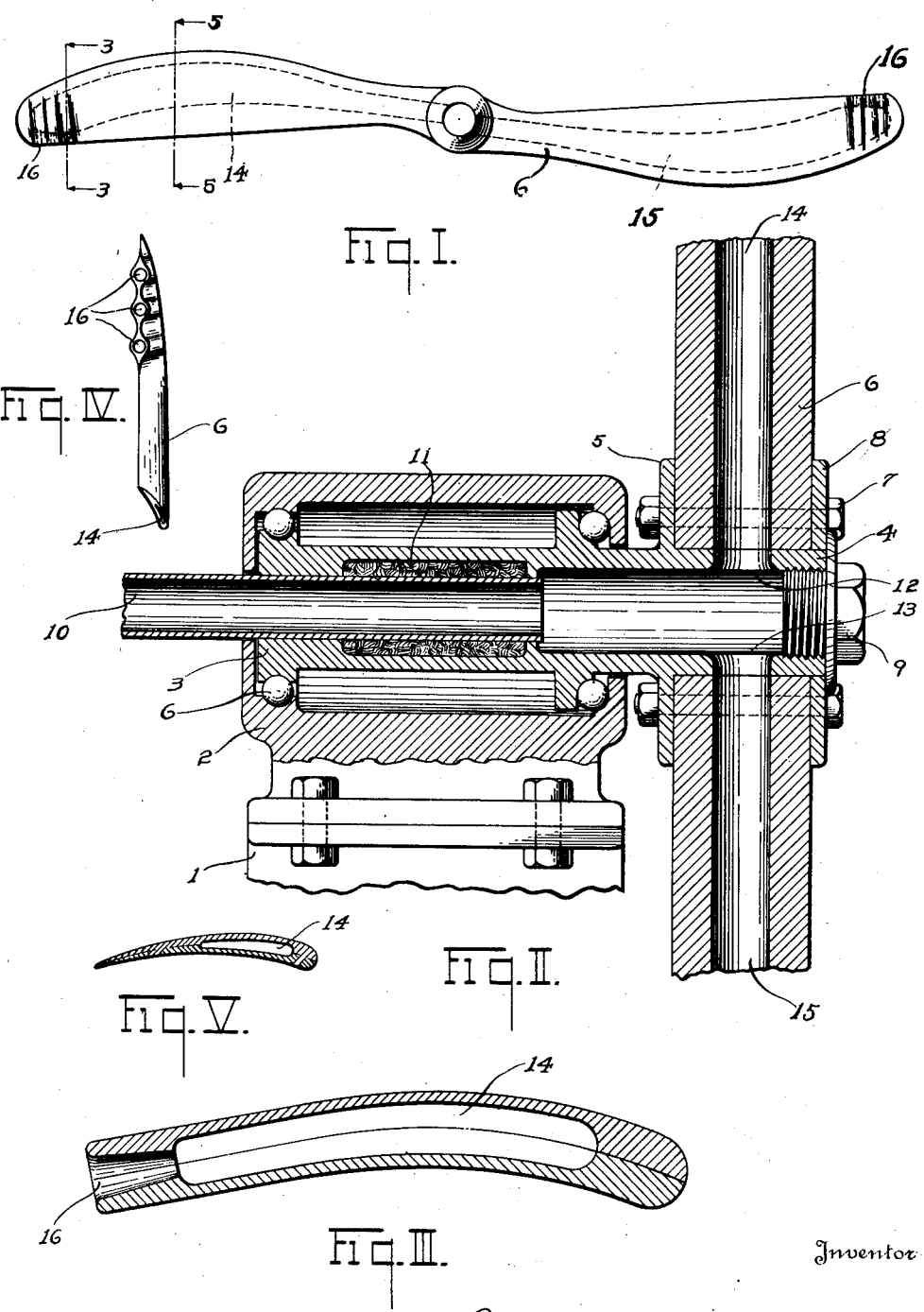

Patented Mar. 29, 1927.

1,622,835

UNITED STATES PATENT OFFICE.

CHARLES O. MARSHALL, OF TOLEDO, OHIO.

PROPELLER.

Application filed September 8, 1921. Serial No. 499,150.

This invention relates particularly to aircraft propellers, and its principal object is to provide a propeller which whirls itself through the air, thereby making it possible to dispense with the usual heavy, intricate, expensive and sometimes troublesome separate motor.

Another object is to provide propeller turning means which has the simplicity and smoothness of operation characteristic of a well balanced turbine. The turbine's simplicity and dependability and its freedom from vibration, such as usually accompanies the operation of reciprocating parts, are desirable features from the standpoint of aircraft propulsion. On the other hand, the high peripheral speed which is necessary for economical turbine operation has heretofore made it seem impracticable to provide an efficient turbine having a speed of rotation sufficiently low to make reduction gearing between the turbine and propeller unnecessary and which at the same time is light and compact enough for installation in either airplanes or dirigibles. In this invention the difficulties outlined above are overcome by providing means whereby the force exerted by motive fluid is caused to act upon the propeller itself at points having speed sufficiently high to enable the energy of the fluid to be utilized without prohibitive loss.

Other objects and advantages will be apparent from the following description, in which reference is had to the accompanying drawings illustrating a preferred embodiment of my invention and wherein similar reference numerals designate similar parts throughout the several views.

In the drawings:—
Figure 1 is an elevational view of a propeller in which is incorporated a turbine of the ancient "Hero" type;

Figure 2 is an enlarged vertical sectional view through the hub of the propeller and the mounting therefor showing a fragment of the propeller and a part of an inlet conduit for the motive fluid;

Figure 3 is an enlarged sectional view taken substantially on the line 3—3 of Figure 1 and showing one of the nozzles through which the motive fluid is discharged;

Figure 4 is a perspective view, enlarged to a lesser extent, of an end of the propeller shown in Figure 1; and Figure 5 is a similarly enlarged sectional view taken substantially on the line 5—5 of Figure 1.

Referring to the drawings in detail, the frame 1 of the machine to be propelled is provided with a suitable bearing 2 within which the shaft 3 of the propeller hub 4 is rotatably mounted, anti-friction balls being interposed, if desired, between the bearing and shaft.

The hub 4 is provided with a suitable fixed hub flange 5 to which the propeller 6 is secured by means of bolts 7 and a clamping ring 8. The hub 4 is hollow, as shown in Figure 2, its outer end being closed by a threaded plug 9 and its inner end communicating with the passage in the hollow shaft 3, the shaft in the form illustrated being shown as integral with the hub.

Extending through the end of the bearing 2 and into the passage in the hollow shaft 3 is a pipe or conduit 10 through which the motive fluid is admitted to the hollow shaft and hub, the joint between the pipe and shaft being made leak-proof, as by packing 11. From the hub the fluid passes through openings 12 and 13 into passages 14 and 15 in the blades of the propeller 6.

Adjacent the tips of each of its blades the propeller is provided with one or more discharge orifices or nozzles 16 leading from the passages 14 and 15 and so formed as to direct the motive fluid rearwardly from the rear edges of the blades. The design of the nozzles may be varied to secure the maximum effect from the reaction of the steam or gas. Preferably, however, they are of the slightly flaring type clearly illustrated in Figure 3. I have illustrated a plurality of circular nozzles, but a single elongated nozzle may, if desired, be substituted for the series of nozzles on each blade. The exterior of the portions of the blades containing the nozzles are preferably so shaped as to reduce to a minimum the resistance of the air to the rotation of the propeller.

Owing to the high speed at which the tips of the propeller travel, the percentage of the energy of motive fluid which is utilized in turning the propeller compares favorably with the percentage that can be utilized in heat engines of other types. Since the power is applied at the ends of the points where the greatest resistance to rotation occurs, the strain on the propeller and hub structure is much less than when the propeller is driven in the usual manner by means of the shaft. The principal strains to be resisted in a propeller in which the power is applied at the tips of the blades are those due to its thrust. The strains caused by the action of the motive fluid in turning the propeller through the air are amply provided by widening the portions of the propeller blades intermediate their tips and the hubs.

The motive fluid may be steam, products of combustion, or other gases, and the power developed at the nozzles may be employed alone or in conjunction with power applied to the shaft. The turbo-propeller herein described may, for example, be operated with an internal combustion engine connected to the shaft, the exhaust gases being discharged through the propeller.

Although my invention is particularly adapted for use in aircraft, it is also applicable to the purpose of propelling wheeled vehicles, boats, missiles, and other devices.

The blades may be made of aluminum alloy or other suitable material and may, if desired, be built up of half portions, as indicated in Figs. 3 and 5, or the passages may be formed by tubular members embedded in the bodies of the blades.

While it will be apparent that the illustrated embodiment of my invention herein disclosed is well calculated to adequately fulfill the objects primarily stated, it is to be understood that the invention is susceptible to variation, modification and change within the spirit and scope of the subjoined claims.

Having described my invention, I claim:

1. In a device of the class described, in combination, a high speed bladed propeller having passages therein and discharge nozzles for said passages, said nozzles being substantially smaller in cross sectional area than said passages and slightly flared at their discharging ends and being located only adjacent the tips of the propeller blades, and means for introducing motive fluid into said passages.

2. In a device of the class described, in combination, a high speed bladed propeller, each of the blades of said propeller having a passage therein and a discharge nozzle opening from the rear of the blade, said discharge nozzle being substantially smaller in cross sectional area than said passages and slightly flared and means for introducing a motive fluid into said passages.

3. In a device of the class described, in combination, a high speed two-bladed propeller comprising propeller blades provided with passages extending longitudinally thereof, the intermediate portions of said blades being wider than the portions adjacent their tips, said blades being provided with restricted slightly flaring orifices opening from said passages rearwardly adjacent the outer ends only for permitting the escape of motive fluid from said passages.

4. In a device of the class described, in combination, a high speed bladed propeller having a hollow hub with blades fixed thereto, said blades having passages opening into the interior of said hollow hub and nozzles adjacent their tips communicating with the passages and discharging rearwardly in respect of the direction of motion of said blades, said nozzles being substantially smaller in cross sectional area than said passages and slightly flared, a hollow shaft extending axially from said hub, the interior of said shaft communicating with the interior of said hub, a support for said shaft, bearings secured to said support, said shaft being journaled in said bearings, and means for introducing a motive fluid into said hollow shaft.

CHARLES O. MARSHALL.